Dec. 20, 1966          W. R. AIKEN          3,293,356
SOLID STATE DISPLAY DEVICE FOR PROVIDING COLOR DISPLAYS
Filed May 31, 1963          4 Sheets-Sheet 1
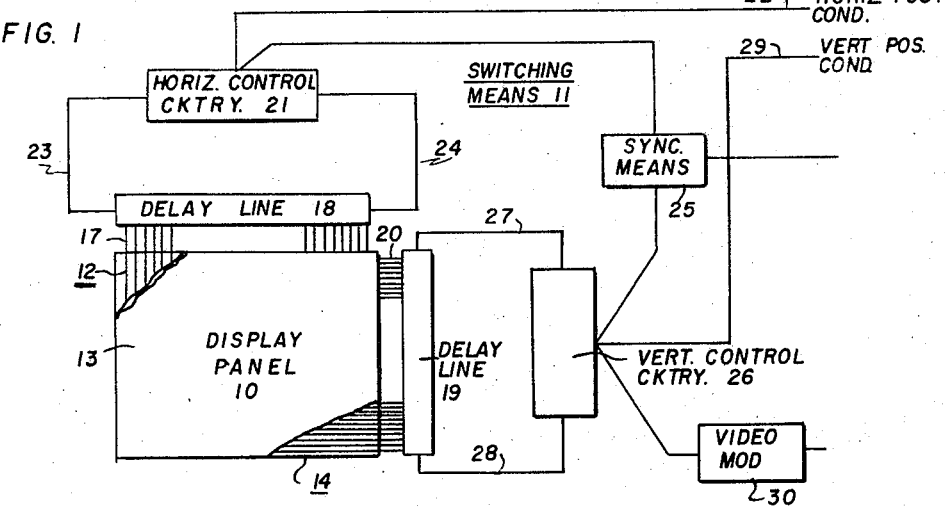
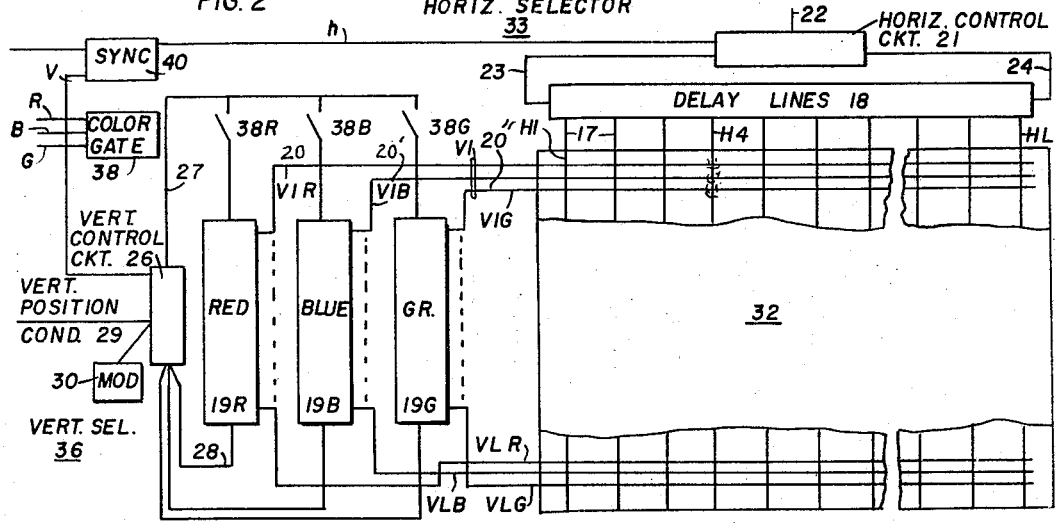
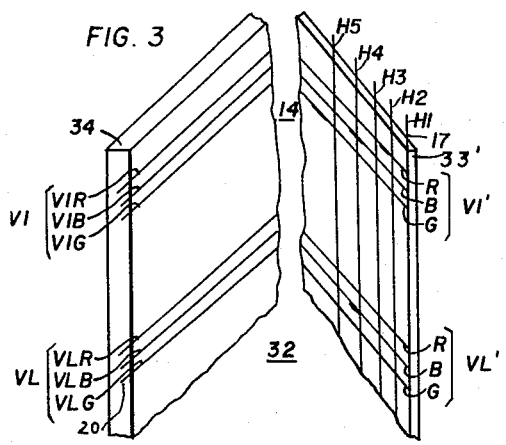
INVENTOR.
WILLIAM R. AIKEN
BY *Brown Jackson Boettcher & Dienner*
ATTYS.

Dec. 20, 1966  W. R. AIKEN  3,293,356
SOLID STATE DISPLAY DEVICE FOR PROVIDING COLOR DISPLAYS
Filed May 31, 1963  4 Sheets-Sheet 2
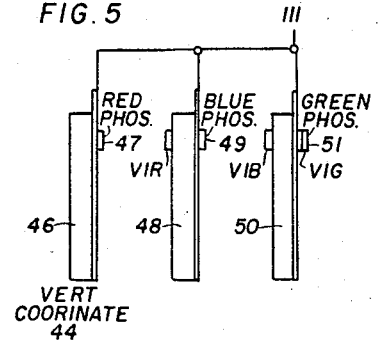
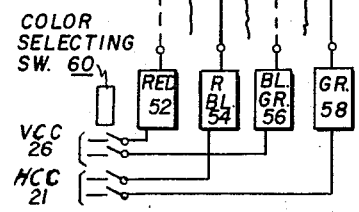
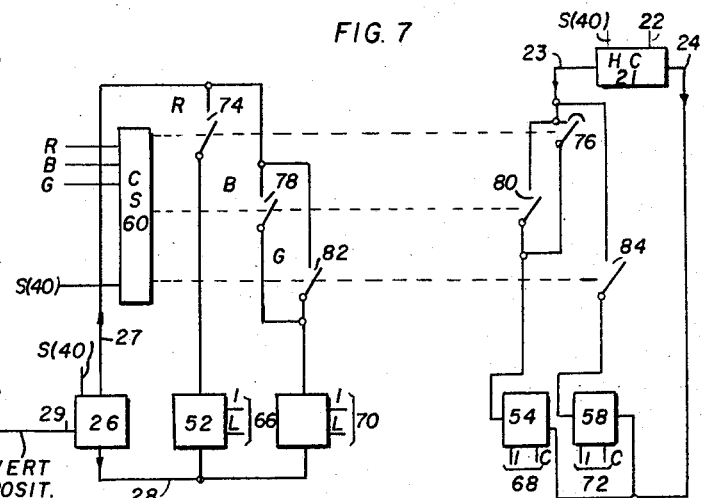
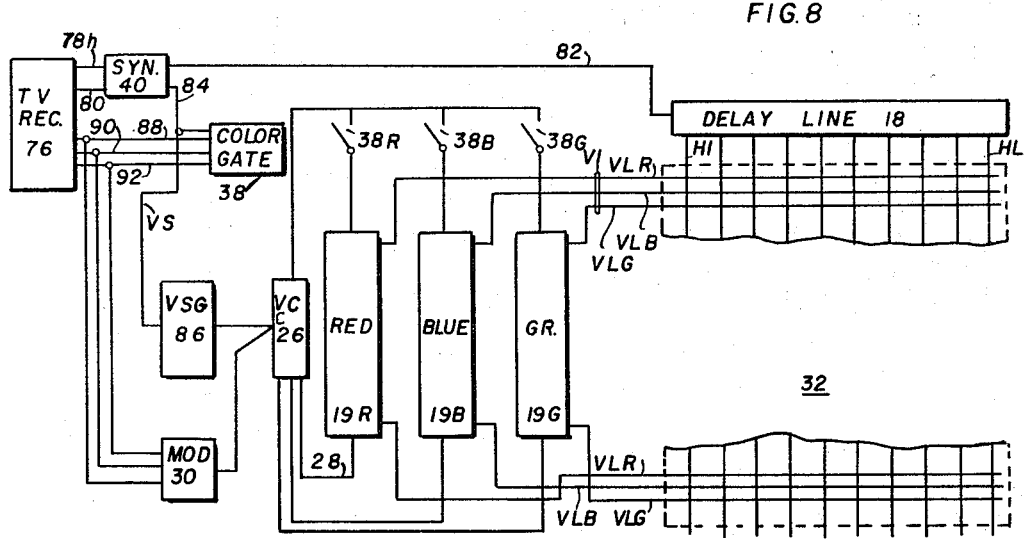
INVENTOR.
WILLIAM R. AIKEN
BY
ATTYS.

INVENTOR.
WILLIAM R. AIKEN

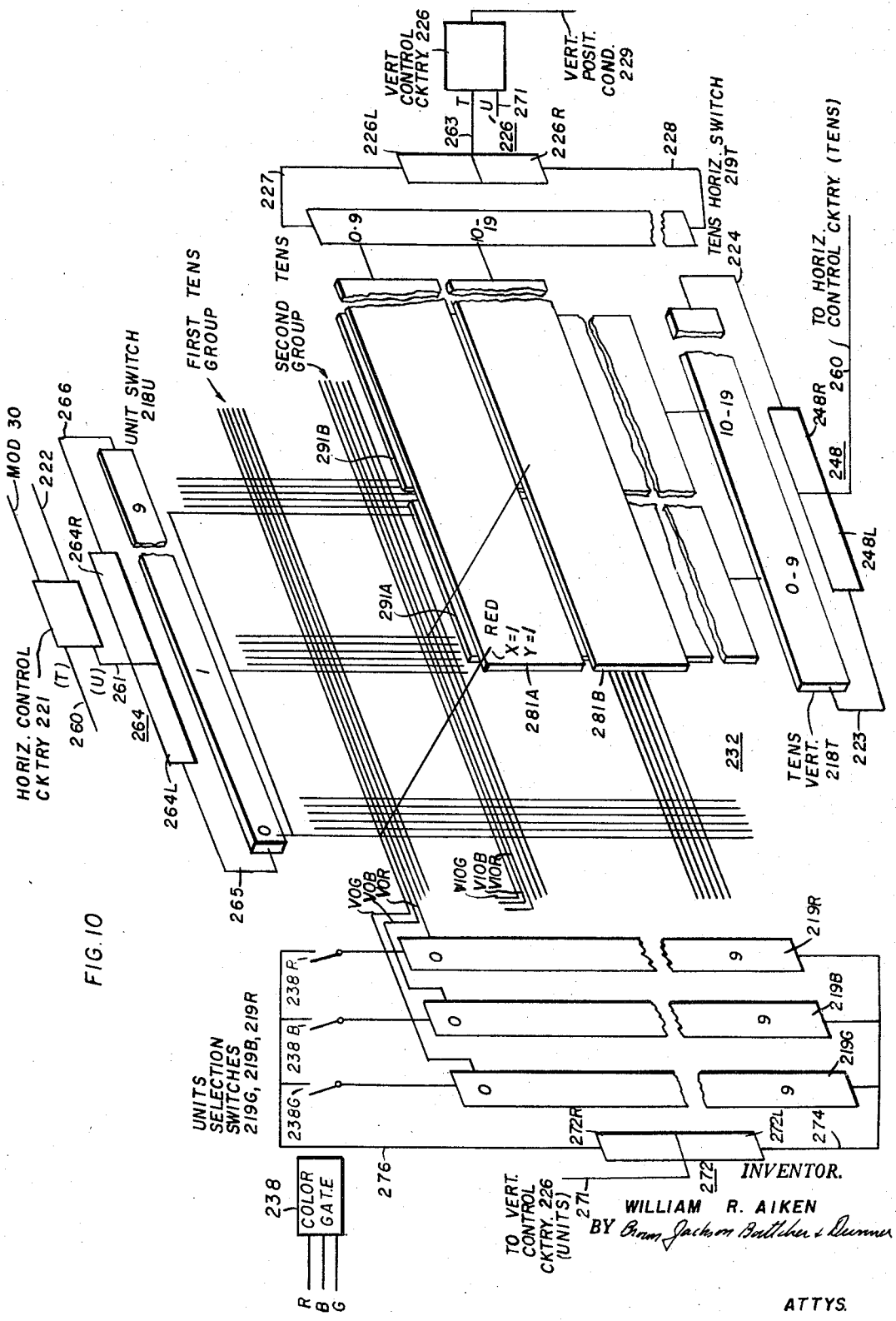

United States Patent Office 3,293,356
Patented Dec. 20, 1966

3,293,356
SOLID STATE DISPLAY DEVICE FOR
PROVIDING COLOR DISPLAYS
William R. Aiken, 10410 Magdalena Road,
Los Altos Hills, Calif. 94022
Filed May 31, 1963, Ser. No. 284,448
23 Claims. (Cl. 178—5.4)

It is an object of the present invention to provide a novel solid state device for presenting polychromatic displays including novel selector circuits adapted for use in the presentation of the color displays.

In recent years considerable development effort has been directed toward the provision of display devices capable of converting electrical signal inputs to color displays for visual observation. However, prior to this time the presentation of such type display has been complicated by unsatisfactory color registration, inefficient switching circuits, and complex target structures. At best the resultant structures have been complex, expensive, and of marginal satisfaction. It is accordingly an object of the present invention to provide a new and novel display device which is operative as a transducer to convert an electrical input to a color display adapted for visual observation.

One of the more promising developments in recent years in the display art comprises an electroluminescent cell which is operative as a transducer to provide black and white displays. Such cell in its most basic form comprises a thin layer of an electroluminescent phosphor disposed between two sets of parallel conductors. The first vertical set of parallel conductors disposed on one side of the phosphor is oriented at right angles to the second horizontal set of conductors which is located on the opposite side of the phosphor. The terms horizontal and vertical are, of course, not intended to be limiting as to the actual disposition of the grid sets in the display device.

The conductor members of the two perpendicularly oriented grid sets located on either side of the phosphor thus establish a matrix comprised of a number of crossover points (each of which may be identified by a unique set of X, Y coordinates) and each of which has a phosphor section disposed therebetween. It will be apparent that with the energization of one conductor of one set and the simultaneous energization of one conductor of the other set, the particular element of phosphor disposed at the point of crossover of the two conductors may be excited to illuminate the phosphor thereat.

It is yet another object of the present invention to provide an electroluminescent cell type display device which is capable of providing a color display, whereby the inherent advantages of a cell type device including reduced physical thickness, lower operating voltages, reduced mass and weight, and increased safety are included in a system for providing color displays.

It is yet another object of the invention to provide a novel grouping of the conductors of at least one of the two conductor sets of the matrix to effect a material reduction in the number of grids required for the display device.

It is another object of the invention to provide a novel filter means for use with the novel grid arrangement in the provision of an improved color display.

In one known arrangement in which a monochrome display is provided on an electroluminescent cell type device, the switching means for the two separate grid sets comprise a first delay line which controls the selective energization of each conductor of the vertically disposed conductor set, and a second delay line which controls selective energization of each conductor of the horizontally disposed conductor set.

Each of the delay lines has a number of taps located at successive increments along its length, each successive one of the taps being connected to a successive one of the conductors or grids in its associated grid set. A pulse generator is provided for each delay line, and the pulse generator is controlled to generate a pair of pulses for transmission along its associated delay line. In one embodiment the pulses of each pair are applied to opposite ends of the line to intersect at the interval on the line at which the tap to be selected is connected. That is, at the point of intersection of the two pulses on the line, a coincident pulse occurs which is of an amplitude substantially larger in value than the amplitude of the individual pulses in the pair, and only the one of the grids connected to the tap on the delay line adjacent the point of occurrence of the coincident pulse will be energized (or selected) by the increased voltage. It is apparent that by variation of the time of generation of the two pulses of each pair a correspondingly different tap on the delay line may be selected.

The pulse generators for the two different delay lines are timed relative to each other to effect the energization of a conductor in each set, and thereby a coordinate point on the grid matrix. That is, each cross point in the matrix is defined by a horizontal and vertical coordinate, and energization of the two grids which pass through such coordinate effects energization of the phosphor at such coordinate.

The values of the pulses and the phosphor excitation level are selected to insure that the portions of the phosphor adjacent the conductors energized by the single pulses in their travel along the lines will not effect illumination of the phosphor prior to coincidence. Stated in another manner, the phosphor must have a value or the delay lines and grids must be so biased that the phosphor will be excited only with the coincidence of four pulses, two pulses being coincident on each of the two delay lines. The amplitude of the pulses provided by the signal generators may be modulated to provide different degrees of brightness.

It is yet another object of the invention to provide an improved switching circuit of such type for use in effecting selective energization of the different crosspoints of the novel solid state display device as well as in other forms of color display devices known in the art, including gas, liquid, vacuum and the like.

It is yet another object of the invention to provide a new and novel switching arrangement in association with a new and novel multiple grid arrangement which minimizes both the complexity of the switching circuits required and the number of grid structures to be energized in the excitation of the various color points on the display.

As will be shown, both the novel color display device and the novel switching circuitry have particular utility when constructed for operation in a digital selection arrangement, such as set forth in my copending application, Serial No. 237,226 which was filed November 13, 1962, and it is a further object of the present invention to provide a digital switching circuit which is operative to selectively control the novel color display disclosed herein.

These and other objects of the invention will be apparent from the following description and accompanying drawings which serve to illustrate the various exemplary embodiments of the invention, and in which:

FIGURE 1 sets forth in a block diagram the novel display panel including the switching equipment as set forth in the said copending application for effecting selective energization of the different coordinate points on the electroluminescent cross grid panel of FIGURE 1;

FIGURE 2 sets forth partially in block and partially in schematic form, the novel color display device including the selector switches which are utilized therewith to effect energization of the display device with the control circuitry of the arrangement set forth in FIGURE 1;

FIGURE 3 is a perspective sectional showing of the display panel set forth in the schematic showing of FIGURE 2;

FIGURE 4 is a novel filter device for use with the switching and grid structures set forth in FIGURES 2 and 3;

Figure 9:
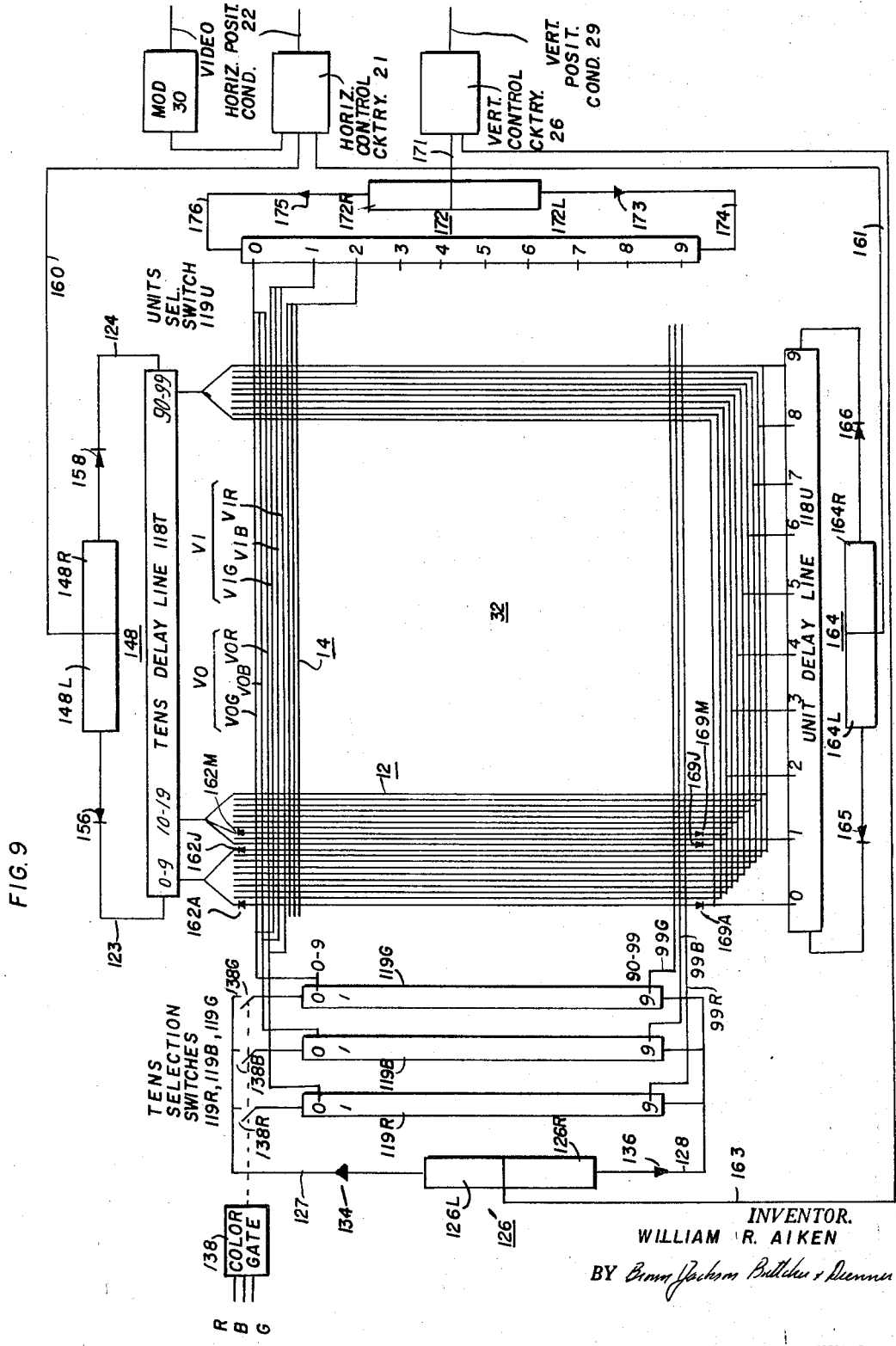

FIGURE 5 sets forth a further embodiment of a novel color display device for use with the selector switching circuitry of FIGURE 2;

FIGURES 6 and 7 set forth a novel arrangement of grid sets for use in energizing different segments of the color phosphors including a novel arrangement of the switching circuits for effecting selective energization of the different grid sets for the different color phosphors;

FIGURE 8 sets forth in a block diagram the manner of connection of the display system to a commercial color TV receiver chassis;

FIGURE 9 shows a novel display system which provides a color display on a novel display device by means of digital selection switching circuitry; and FIGURE 10 shows a display system which includes novel switching circuitry including grids and optical gating for use in the provision of a color display.

*Description of switching circuitry for electroluminescent cell*

With reference first to FIGURE 1, switching means 11 of the structure disclosed in my copending application are schematically illustrated for the purpose of briefly disclosing an operable structure used in effecting energization of the different points on an electroluminescent cell display panel 10. The display panel 10 disclosed in FIGURE 1 comprises an electroluminescent panel including a set of vertically disposed conductors 12, a set of horizontally disposed conductors 14, and a layer of phosphor 13 disposed between the two coordinate sets.

The switching means 11 basically comprise a horizontal position input lead 22 which couples voltages to the horizontal control circuitry 21, the voltages being representative of the horizontal coordinates of the data to be displayed. Two output circuits 23, 24 are connected from the control equipment 21 to the opposite ends of delay line 18. Delay line 18 has a number of taps, such as 17, disposed at successive increments along the length thereof, each of which is connected to a different conductor of a vertical set of conductors 12 on the display panel. With the receipt of a voltage signal over conductor 22 indicating the particular one of the vertical conductors 12 to be energized, the horizontal control circuitry 21 couples a first signal of a pair over conductor 23 and a second signal of the same pair over conductor 24, the time of generation of coupling of the pulses of each pair to opposite ends of the delay line over conductors 23, 24, effecting coincidence of the two pulses on the delay line at the particular point at which the delay line tap for the desired conductor of the vertical set 12 is connected.

As noted in the copending application, the switching system may be of reflective type in which the two output pulses of each pair of pulses provided by the horizontal control circuit 21 are coupled to the same end of the line. In such arrangement the first pulse travels the length of the delay line, such as 18, and is reflected, and the second pulse of each pair is timed to meet the first pulse in its reflective travel along the delay line 18 at the one of the taps which is to be selected by the coincident pulse.

A vertical position conductor 29 couples pulses to vertical control circuitry 26 which are representative of the vertical coordinates of the data to be displayed. With the supply of such signal information to the vertical control circuitry 26, a first pulse of the pair is coupled over conductor 27 to one end of the delay line 19, and a second pulse of the same pair is coupled over conductor 28 to the opposite end of delay line 19, the coupling of the two pulses being timed so that the pulses coincide at the tap on the delay line 19 which is connected to the one of the conductors 14 which passes through the vertical coordinate represented by the input signal received over vertical positioning conductor 29.

Synchronization means 25 are operative to effect relative timing of each pulse of each pair provided by the horizontal and vertical control circuitry 21 and 26 for the horizontal and vertical delay lines 18, 19, and are further operative to insure that the pulse pair on the horizontal delay line 18 and the pulse pair on the vertical delay line 19 coincide at the desired points on the lines 18, 19 at the same time relative to each other to effect energization of the phosphor at the coordinate defined by the two conductors energized in such manner.

The brightness of the point selected by the four pulses is determined by the amplitude of the resultant coincident pulses. As indicated in the copending application, the horizontal and vertical control circuits 21, 26 provide positive and negative pulses respectively, whereby the four pulses in coincidence result in the application of a potential difference of even larger amplitude across the phosphor layer 13 which is disposed between the horizontal conductors 14 and the vertical conductors 12.

Video modulation is provided by connecting the modulation signals over video circuit 30 to the vertical control circuitry 26 to thereby adjust the amplitude of the output pulses of the vertical control circuitry 26 to different values whereby the brightness of the display at the selected point will be correspondingly adjusted. The video modulation circuitry may, of course, also be connected to control the horizontal control circuitry 21 if desired.

*Color display arrangement utilizing grid selection*

With reference now to FIGURE 2, a novel color display device 32 including modified selector circuitry 33, 36 for effecting energization of such device is set forth thereat. As shown in FIGURE 2, the arrangement basically comprises a display device 32 including a horizontal selector 33, a vertical selector 36, a color gate 38 and a sync circuit 40.

With reference to FIGURE 3, the display device 32 is shown in more detail thereat. As there shown the electroluminescent color display panel 32 comprises a support member 33' which may be of a commercially available substrate, precoated with stannic oxide, transparent conductive film having a resistivity of approximately 100 ohms per square. A plurality of parallel vertically extending conductor strips 12 (H1, H2 etc.) are formed by electric arc etching through the stannic oxide film. The conductors may also be prepared from other materials, such as stannic chloride and titanium dioxide, by using deposit techniques well known in the art.

A set of horizontally extending grids or strips of electroluminescent phosphor are deposited over the vertical strips, which strips may comprise a crystalline film or a dielectric suspension of phosphor particles or any other well known form of phosphor material. As shown in FIGURE 3, the strips are disposed on support member 33' in groups, such as V1, superposed on vertical conductors H1, etc., each group being comprised of three phosphor strips, such as R, B, G, each of which strips is capable of emitting light of a different color (red, blue, green in the present embodiment) responsive to the establishment of an electrical potential thereacross.

A thin insulator or dielectric layer is applied over the phosphor strips, and a plurality of groups of horizontal conductors V1–VL are formed on the dielectric layer. Each group V1–VL comprises three conductors, such as V1R, V1B, V1G, each of which conductors is disposed in superposed relation with an associated one of the phosphor strips R, B, G, to minimize any possible registration problems. Alternatively, the horizontal conductors may be formed in the inner face of support member 34 as shown in FIGURE 3.

In either arrangement, it will be apparent that with the display device assembled, corresponding ones of the horizontal conductors V1R, V1B, V1G of group V1 are in superposed and coextensive relation with the corresponding strips of phosphor R, B, G of group V1'. Thus, conductor V1R is coextensive with phosphor strip R of group V1', horizontal conductor V1B is coextensive with phosphor strip B of group V1', and horizontal conductor strip V1G is coextensive with phosphor strip G of group V1'.

In one embodiment the horizontal conductors V1R, etc., are formed on the dielectric layer (not shown) which covers the phosphor layer 13 by vacuum evaporation of pure aluminum through a mask and thereafter spraying a protective plastic film coating over the aluminum. If desired, variable resistance or rectifier areas (not shown) may be located between each horizontal conductor strip, such as V1R, and its corresponding phosphor strip, such as R.

The back support member 34 may be a back cover plate for the structure and may be of glass, plastic or other suitable transparent material if viewing of the display on both sides of the device is desired. Alternatively, the back plate 34 may be opaque, and light-containing means may be located along the edges to minimize the introduction of light through the glass edges into the display area. Metal contacts, such as 20, are fastened to the ends of the horizontal strips such as V1R, V1B, V1G, etc., to provide a means for effecting external connection of the taps on the delay lines, such as 19R, 19B, 19G (FIGURE 2) to the horizontal strips. In a similar manner, metal contacts 17 are connected to the ends of the vertical extending strips H1–HL for the purpose of connecting such strips to the different taps on the delay line 18 of the selector energizing means.

With reference once more to FIGURE 2, the manner of connection of the display device 32 to the selector circuitry 33, 36 will be more apparent. As there shown, the horizontal selector 33 comprises a selection circuit similar to that set forth in FIGURE 1 and basically includes a horizontal positioning conductor 22 for coupling voltage signals to a horizontal control circuit 21 which in turn is operative to provide pairs of pulses for coupling to a delay line 18. As in the embodiment set forth in FIGURE 1, the value of the voltage applied over horizontal positioning conductor 22 indicates the particular one of the taps on delay line 18 to be selected (i.e., the "x" coordinate of the crosspoint).

The horizontal control circuitry 21 is operative in response to such signal to generate a pair of pulses, one of which pulses is transmitted over conductor 23 to one end of the delay line 18, and the other of which is coupled over conductor 24 to the other end of delay line 18, the time of transmission of the pulses over the delay line being such as to effect coincidence of the pulses at the particular tap 17 on the delay line which is connected to the one of the vertically extending conductors H1–HL to be energized. Synchronization signals received over the horizontal conductor H from the sync circuit 40 determine the particular time at which the horizontal control circuitry 21 effects the selection of the desired vertical conductor. Delay line 18 may be a flat plate delay line, a torroid capacitor delay line or any of the well known types of lines which are readily adaptable to tapping at successive intervals along its length, and which has transmission characteristics related to the pulse transmission rates required for the displays to be provided.

The vertical selector 36 for the display apparatus 32 comprises a vertical positioning conductor 29 which is connected to vertical control circuitry 26 of the structure set forth in FIGURE 1 (and my copending application), the vertical positioning conductor 29 being operative to couple signals of different voltage values to vertical control circuitry 26 to indicate the one of the taps to be selected and the vertical coordinate on the display device which is to be energized, different value voltages thereby representing different vertical (y) coordinates. The vertical control circuitry 26 is operative in response to the different value voltages to provide a pair of output pulses which are related to each other in time (in the manner of the output pulses of the horizontal control circuitry 21) to effect selection of the indicated tap. Vertical control circuitry 26 is also controlled by vertical sync pulses received from the sync means 40, whereby selection of the desired vertical and horizontal coordinates which extend through the desired crosspoint is simultaneously effected.

In the present embodiment, the pulse pair output of the vertical control circuitry 26 are coupled over conductors 27, 28 alternatively to the opposite end of one of three delay lines 19R, 19B and 19G. Selective connection of the pulse pair output of vertical control circuitry 26 over conductors 27, 28 to the delay lines 19R, 19B, 19G is effected by switches 38R, 38B, 38G respectively, which are in turn controlled by a color gate 38. Color gate 38 may be a conventional electronic switching arrangement which effects selective closure of the contacts 38R, 38B, 38G in response to the energization of the corresponding input leads R, B, G. Alternatively color gate 38 may be controlled to effect automatic sequencing of contacts 38R, 38B, 38G responsive to each vertical sync pulse received from the sync means 40 at the start of each of three succesive raster scans (if a raster scan is utilized). Although the switches 38R, 38B and 38G are indicated in the figures as mechanical switches, it will be understood that such switches are conventional electronic switches, such as transistors, photo cells, vacuum tubes and the like.

Each of the delay lines 19R, 19B, 19G is similar in structure to the delay line 19 of FIGURE 1. Thus, the red delay line 19R is connected to effect selective energization of successive taps 1–L which are connected respectively over conductors, such as 20, to the first grid, such as V1R, of successive groups of horizontally extending grids, such as V1, on the dipslay panel 32. In a similar manner, successive output taps on the blue delay line 19B are connected over conductors, such as 20, to the second conductor, such as V1B, of successive groups of horizontal phosphor strips, such as V1–VL on the display panel 32. The successive output taps 1–L on the green delay line 19G are connected over conductors, such as 20, to the third conductor, such as V1G, VLG of each successive group V1–VL of the horizontally extending phosphor strips.

*Operation in the display of a color at a point on the display panel 32*

For exemplary purposes, it will now be assumed that the specific point on display panel 32 which is identified by V1–H4 and defined by the intersection of the fourth vertically disposed grid H4 and the three horizontally disposed grids V1R, V1B, V1G of group V1 is to be energized.

In effecting the energization of the fourth vertical grid H4, a voltage signal is coupled over horizontal positioning conductor 22 to the horizontal control circuitry 21, which signal is of a value to indicate the coordinate of the vertically disposed grid to be selected. Sync circuit 40 controls horizontal delay circuitry 21 in the transmission of a pair of pulses over conductors 23, 24 to opposite ends of delay line 18 to effect the coincidence thereof at the fourth tap on delay line 18, the time of transmission of the pulse pair by the horizontal control circuitry 21 being controlled by sync circuit 40 in the manner described in my above-identified copending application.

In a similar manner, a voltage signal provided over vertical positioning conductor 29 has a value which represents the vertical coordinate for the desired point (V1 in the present example) and sync circuit 40 controls the vertical control circuit 26 to transmit a pair of pulses over conductors 27, 28 which are related to the value of the input signal received over vertical pulse positioner conductor 29.

If the color red is to be displayed, a color gate signal is transmitted over conductor R to the color gate 38 which effects closure of gate 38R. The pulse output of vertical control circuitry 26 is thus transmitted to the opposite ends of red delay line 19R to provide a coincident pulse at tap one on delay line 19R and on conductor V1R. It is apparent that if the color blue were to be selected, the input conductor B of color gate 38 would have been energized, and contacts 38B would have been closed to connect the output conductors 27, 28 of vertical control circuit 26 to the delay line 19B. In a similar manner connection of a color gate signal to input conductor G of color gate 38 will effect closure of contacts 38G, and the coupling of the output of vertical control circuit 26 to the opposite ends of delay line 19G. It is readily apparent that the conductors RBG input to the color gate 38 may be energized simultaneously, independently, or in any combination to provide a display in the colors thus selected.

With the simultaneous energization of horizontally disposed conductor V1R and vertically disposed conductor H4, the crosspoint of the two conductors V1R, H4 on the display device 32 will be energized by a potential of a value which effects the excitation of the phosphor (red in the present example) located between the two conductors, and the display of a red dot on the display device 32 at such conductors. The phosphor in the display panel 32 has a response such that the voltage provided by a coincident pulse on one grid alone in either set is insufficient to excite the phosphor to illumination. However, the phosphor will be excited to luminescence responsive to the coupling of a coincident pulse to a grid in both the horizontal set 12 and the vertical set 14 of the conductors.

The foregoing example sets forth the manner in which any point on the display panel 32 may be selectively energized to provide a display of a red, blue, or green color or any combination of such colors at any desired point on the display device. As will be shown hereinafter, the device is also readily adapted for use with a raster scan, and if desired, the provision of a television display.

It should be noted that a specific saving in cost is effected by constructing and disposing the color selective grids V1R, V1B, V1G in the horizontal dimension. That is, in that fewer horizontal grids are required in a 3:4 aspect ratio display for equal resolution, and each group of color selection grids requires three separate grids, a substantial reduction in the number of selective grids is achieved by placing the color selection set to extend on the horizontal dimension. In addition to reducing the number of grids, a smaller number of taps is required on the delay lines and the selectivity demands on the delay lines are minimized whereby greater reliability in operation is achieved. An additional advantage is further realized in the manufacturing of the units in that the number of connections to be made between the display device and the switching circuitry is reduced.

In a further novel embodiment of the invention, the switching circuit of FIGURE 2 is used with a display apparatus, such as 32, which is modified by substituting a strip (or a layer) of electroluminescent phosphor, such as zinc oxide, cadmium oxide, etc., for the strips R, B, G of FIGURE 3. Selective energization of any one of the crosspoints (such as V1R, H4) by the grids illustrated in FIGURE 2 will result in the presentation of a phosphor dot of a light color. A color display is provided in such type arrangement by introducing a filter sheet, such as shown in FIGURE 4, which may comprise a suitable transparent supporting member for a filter device having groups of red, blue and green filter lines V1–VL printed on the surface thereof which correspond to the conductors V1R, etc., in the groups of horizontally disposed selection grids V1–VL (FIGURE 3). In assembled relation, filter line R of group V1 will be in superposed relation with grid V1R of horizontal group V1, etc.

It is apparent that if the equipment is energized, as in the example above, to selectively energize vertically extending conductor H4 and horizontally extending conductor V1R, a point source of light is provided at the crosspoint of such conductors, and the adjacent filter line R will provide a filtered output of such light which appears as a red dot to the eye of the viewer. The manner in which the various points may be displayed in different colors will be apparent therefrom.

In a more economical version of such embodiment the filter may comprise a sheet of gelatine substance on which the lines R, B, and G are imprinted, or alternatively the filter may comprise a sheet of glass having the red, blue and green strips of approximately ten mils wide each imprinted thereon.

In another embodiment, the filter may comprise a honeycomb or shadow mask type structure in which event the phosphor would be deposed as dots which correspond to the crosspoints and apertures of the mask or honeycomb instead of in the linear strip arrangement shown in the drawings.

In yet another embodiment the phosphor may comprise a sheet or layer of phosphor as on the display device 10 of FIGURE 1.

In a further embodiment in which more detailed resolution is desired, a display device 44 such as illustrated in FIGURE 5 may be provided for use with the novel switching arrangement. As there shown, the display device comprises three separate support members 46, 48, 50, each of which is adapted to provide a display of a different one of the colors. Thus, the support member 46 which may be similar to support member 34 (FIGURE 3) may comprise a commercially available substrate precoated with stannic oxide, transparent conductor film and on which a plurality of vertically extending conductor strips, such as H1–HL, are formed by electric arc etching through the stannic oxide film. A strip or film of electroluminescent phosphor which is capable of emitting red light responsive to energization, is laid or deposited as a horizontal strip 47 similar to the red strip in vertical group V1 (FIGURE 3). A corresponding conductor strip V1R extends horizontally in coextensive relation with the red phosphor strip on the facing surface of the second support member 48. In manufacture, the strip V1R would be formed by evacuation of pure aluminum through a mask and depositing thereof on the red phosphor strip for support by member 46 to eliminate any possible registration problems. If the horizontal strips, such as V1R, are to be transparent, a stannic oxide transparent conductor film would be used.

In a similar manner, the second surface support member 48 locates a set of vertically extending conductors H1–HL having a series of horizontal phosphor strips 49 extending in a horizontal direction deposited thereon, the phosphor strips 49 thus deposited being capable of emitting a blue light responsive to the establishment of a potential of a predetermined value thereacross. A horizontally extending conductor strip, such as V1B, is provided for each blue phosphor strip and each strip V1B extends horizontally in a coextensive manner with an associated blue phosphor strip. The conductor V1B is either deposited on the blue phosphor strip (with a dielectric layer between, if desired) or is supported on the facing surface of the support member 50.

The outer surface of support member 50 locates a set of vertically extending conductor strips, H1–HL, and a set of horizontally extending green phosphor strips 51 located thereon, each of which strips has a corresponding conductor strip, such as V1G, disposed in coextensive relation therewith. As will be apparent from the showing in FIGURE 5 the red, blue and green phosphor strips 47, 49, 51 associated respectively with the horizontal conductors V1R, V1B and V1G, will extend in coextensive superposed relationship when the structure is assembled with the support members 46, 48, 50, in sandwiched relation.

The manner of connection of display device of FIGURE 5 to the circuitry of FIGURE 2 will be readily apparent. That is, each conductor H1 of each of the three sets of vertically extending conductors located on support members 46, 48, 50, respectively are multiplied and connected to tap H1 on delay line 18 (FIGURE 2). Each of the other vertically extending conductors, such as H2, are multiplied and connected to the second tap on the delay line 18, etc. The horizontally extending conductor sets V1R–VL are connected to the terminals 1–L on the red delay line 19R; the horizontally extending conductors V1B are connected to taps 1–L on the delay line 14B and the horizontally extending conductors, such as V1G–VLG are connected to taps 1–L on the green delay line 19G. The circuitry of FIGURE 2 is operated as described above to provide selective energization of the different points of the different color phosphors.

In the arrangement set forth in FIGURE 5, it is apparent that three separate sets of vertically extending conductors H1–HL are required for use in combination with three separate sets of horizontally extending conductors V1–VL. In a further novel embodiment set forth in FIGURES 6 and 7, a color display is provided which includes two vertical sets of grids and two horizontal sets of grids, and in which four delay lines 52, 54, 56, 58 are connected for selective use in the energizing of the delay lines by a color selecting switch 60.

As shown in FIGURE 6, a first set of horizontally extending conductors 66 (similar to V1R—FIGURE 2) is controlled by a delay line 52 and a set of vertically extending conductors 68 is connected for selective energization by delay line 54. A second set of horizontal extending conductors 70 is connected for selective energization by delay line 56. It will be apparent that vertical grid set 68 is connected for use with horizontal grid sets 66 and 70, and horizontal grid set 70 is connected for use with vertical sets 68, 72.

In the provision of a display in the color red, the color selection switch 60 connects delay line 52 to the vertical control circuitry 26, and connects delay line 54 to the horizontal control circuitry 21. In the selection of the blue color, the color selection switch 60 connects the delay line 56 for the horizontally extending conductors to the vertical control circuit 26 and connects delay line 54 to the horizontal control circuitry 21. In the selection of the color green, the color selection switch 60 connects the delay line 56 to the vertical control circuitry 26 and connects the delay line 58 to the horizontal control circuitry 21.

The manner of operation is better understood with reference to FIGURE 7 in which the control circuitry 21, 26, etc., similar to that shown in FIGURE 2, is shown in block form. The input signals for such arrangement include a signal indicating the desired vertical coordinate for coupling over vertical position conductor 29 to the vertical control circuitry 26, a signal indicating the desired horizontal coordinate of the display point for coupling over horizontal position conductor 22 to the horizontal control circuitry 21, and a signal indicating the color to be displayed for coupling over the appropriate conductor R, B, or G to the color selection switch 60, and a sync signal over conductor S (40).

As a sync signal is coupled to horizontal control circuitry 21, vertical control circuitry 29 and color switch 60, the double pulse output of the vertical control circuitry 26 is extended over conductors 27 and 28, alternatively to delay line 52 or 56 in accordance with the color selection indicated by the input signal to the conductors R, B, G, for color selection switch 60. Additionally the double pulse output of the horizontal control circuitry 21 is coupled over conductors 23, 24 to the opposite ends of delay lines 54, 58, respectively, depending upon the particular color to be displayed as determined by the input signal received over conductors R, B, G by the color selection switch 60.

As a specific example, assuming the information is to be displayed as a red dot at the coordinate point identified by V1R–H4, the voltage signals representative of such coordinate are coupled over conductors 22, 29 respectively to the horizontal and vertical control circuitry 21 and 26. A gating signal is transmitted over the input R to the color switch 60, which responsively effects the closure of contacts 74, 76, to connect delay line 52 to receive the pulse pair output of vertical control circuitry 26, and to connect delay line 54 to receive the pulse pair output of horizontal control circuitry 21. Pulse coincidence thereupon occurs at tap 1 on delay line 52 to effect the energization of the first horizontally extending conductor of the conductor set 66 (FIGURE 6). In a similar manner, the pulse pair output of the horizontal control circuitry 21 will be extended over conductors 23, 24 and over closed contact 76 to the opposite ends of the delay line 54 to provide a coincident pulse at the fourth tap on delay line 54, and thereby selectively energize the fourth vertically extending conductor H4 of the conductor set 68. It is apparent therefrom that the red phosphor which is located at the crosspoint of the first horizontally extending conductor of set 66 (FIGURE 6) and the fourth vertically extending conductor of set 68 will be energized to provide a display of a red point at coordinate V1, H4. The same coordinate would be energized in the blue color by coupling a selective signal over blue conductor B to color selector 60 (and the same coordinate representing voltage signals over conductors 22 and 29 respectively). With the receipt of such signal, color selection switch 60 effects the closure of switches 78, 80 whereby the output of the vertical control circuitry 26 and horizontal control circuitry 22 is coupled to delay lines 56 and 54 respectively. As a result thereof, the first horizontally extending conductor of the set 70 and the fourth vertically extending conductor of the set 68 will be energized to effect the selective energization of the phosphor located at the crosspoint V1, H4 and the display of a blue color dot thereat.

In a similar manner a green dot may be excited by coupling the same coordinate voltage signals to the conductors 29 and 22 to vertical and horizontal control circuitry 26, 21 respectively, and simultaneously effecting the coupling of a color selection signal to input conductor G of the color selection switch 60. In response thereto, color selection switch 60 effects closure of contacts 82 and 84, and the output of vertical control circuitry 29 is accordingly coupled to the delay line 56 to effect selective energization of the first horizontally extending conductor V1 of set 70. The output of the horizontal control circuitry 21 is extended over contacts 84 to the delay line 58 to effect the selective energization of the fourth vertically extending conductor H4 of conductor set 72, and accordingly the green phosphor located between such conductors at coordinates V1, H4 is energized to provide a display of a green dot thereat.

It will be apparent that the arrangement of FIGURES 6 and 7 effects a material reduction in both the cost of the display device, and in the selector equipment which is utilized in the provision of the color display. In addition to reducing the number of grid sets required, and eliminating several switching circuits, the device is further meritorious in its ability to use phosphor film sheets rather than strips, if desired.

In the foregoing descriptions of the operation of each of the novel display devices examples were given of the manner in which any point on the display might be selectively energized. It will be apparent to parties skilled in the art that the equipment may also be utilized in arrangements in which a raster scan is desired if proper considerations are given to the time requirements of the system. In a raster scan the system shown in FIGURE 2, for example, would be operated by coupling a sawtooth wave to the horizontal positioning conductor 22 at the horizontal line scan rate of the particular system in which the equipment is used, and by coupling a vertical sawtooth signal to the vertical control circuitry 26 at the frame rate of the system with which the display is being used. In accordance with well known techniques, the generation of the horizontal and vertical sawtooths would be synchronized by the synchronization means, such as 40. It will be apparent that the shape of the horizontal sawtooth will be determined by the values of the voltage required to select successive selection of the taps H1–HL on the delay line 18. In a similar manner, the shape of the vertical sawtooth will be determined by the value of the voltages required which are necessarily coupled to vertical control circuitry 26 to effect selective energization in succession of the taps V1–VL of delay lines, such as 19R.

With reference now to FIGURE 8, one embodiment of an arrangement for use in reproducing commercial color broadcasts is shown thereat. The systems as there illustrated utilize the display device 32, the vertical selector of FIGURE 2 including vertical control circuitry 26, modulator 30, color gate 38 and delay lines 19R, 19B, 19G. The delay line 18 for effecting successive energization of the vertically extending conductors, H1–HL is considerably simplified in that by proper selection of the values of the components of the delay line 18, a single pulse may be coupled to the delay line 18 at the horizontal rate, each such pulse being triggered by the horizontal sync pulse 40 received from the sync means 40 and effecting energization of the successive conductors H1–HL in its travel during such time.

As there shown the system further comprises a standard color receiver circuit, such as for example, RCA Model CT100, Chassis No. CTC2, such receiver being identified in the drawing by numeral 76. It will be understood that such receiver includes suitable power supply capable of energizing the various components of the system and provides the conventional broadcast signals for the display unit including horizontal sync, vertical sync, color sync and video signals.

As shown, the horizontal and vertical sync sweep outputs of the TV receiver 76 are coupled over conductors 78 and 80 to sync means 40 which in turn couples an amplified horizontal sync signal over conductor 82 to the delay line 18, and an amplified vertical sync signal over conductor 84 to the sync input for the vertical control circuitry 26 and also to the input for a vertical sawtooth generator 86 and the color gate 38. The output of vertical sawtooth generator 86 is coupled to the vertical positioning conductor 29 of the vertical control circuitry 26 (FIGURE 2), the sawtooth output being of a value and shape to effect successive energization of each of the taps on a delay line, such as 19R, during one frame of the raster.

The color gating signals received by the receiver 76 are coupled over conductors 88, 90, 92 respectively to the color gate 38, and the video signals containing the information to be displayed are coupled over the modulator circuit 30 to the vertical control circuitry 26. The manner in which the system is operative responsive to the receipt of such signals will be apparent from the foregoing description of the switching systems as set forth hereinbefore.

*Digital selection structure*

According to the embodiment of the display system set forth in FIGURE 9, the vertical grids 12 on the display device 32 (such as shown in FIGURE 2) are divided into groups of one hundred conductors, each one hundred conductors being divided into groups of ten. A pair of delay lines 118T, 118U is provided for each group of one-hundred vertical grids. Each delay line, such as 148, 164, includes ten taps, the first delay line, such as 118T of each pair being connected as a tens switch and the second delay line, such as 164, of each pair being connected as a units switch. Each grid on the panel is connected to the taps on the tens and units switches for its set which corresponds to its assigned position in the grid set. Selection of a grid is effected with the simultaneous selection on the tens and units switch of the taps to which the conductor is connected.

As in the embodiment shown in FIGURES 1 and 2, the arrangement includes a horizontal position input lead 22 which couples voltages to horizontal control equipment 21 representative of the horizontal coordinates of the data to be displayed. A first output circuit extends over conductor 160 to the double pulsers 148L, 148R which are in turn connected over pulse drivers 156, 158 and conductors 123, 124 respectively to opposite ends of a "tens" delay line 118T for the vertical conductor set. Tens delay line 118T includes ten taps, identified as taps 0–9, 10–19, 20–29 . . . 90–99. Tap 0–9 is connected common to the first ten vertical grids on the panel 10, the second tap 10–19 is connected common to the second group of ten vertical grids, etc. The connection of each common tap, such as 0–9, to the group of ten conductors associated therewith is effected over individual diodes, such as 162a–162j. Each of the other groups of ten conductors is coupled to its common tap in a similar manner.

The horizontal control circuitry 21 is also connected over conductor 161 to double pulser 164 which includes a first section 164L connected over pulse driver 165 to one end of a "units" delay line 118U for the vertical grid set, and a second section 164R connected over pulse driver 166 to the opposite end of units delay line 118U.

Units delay line 118U includes ten taps identified as units taps 0–9, tap 0 being connected to the "zero" or first grid in each group of ten grids, i.e., grids 0, 10, 20, 30 . . . 90. In a similar manner, the tap for units digit 1 is connected to grid 1 (the second grid) in each group of ten grids, i.e., grids 1, 11, 21 . . . 91. The grids in the different groups to a common tap, such as tap 0, tap 1, etc., on the units delay line 18U are effected over individual diodes, such as 169a–169j, etc.

A grid in a set, such as the twelfth grid in the vertical grid set, is thus connected over diode 162m to tap 10–19 on tens delay line 118T and over diode 169m to the units tap 2 on units delay line 118U, and as shown in more detail hereinafter the twelfth vertical grid is energized by a given signal responsive to the simultaneous selection of tens tap 10–19 on tens delay line 118T and the units tap 2 on units delay line 118U.

The vertical control circuitry 126 along with color gate 138 determines the one or ones of the horizontal conductors to be energized. That is, with reference to FIGURES 2 and 3, it will be recalled that the horizontal grid set of the display device 32 includes a plurality of groups of horizontally disposed conductors V0, V1, etc., each of which groups V0, V1, etc., includes a set of three conductors such as V0R, V0B, V0G; V1R, V1B, V1G; etc., for selectively energizing associated strips of phosphor R, B, and G. For convenince of showing, the first grid group in the disclosure of FIGURE 9 is identified as group V0 which includes grids V0R, V0B, V0G, etc. It is apparent that the grids could be identified as grids 1–10, 11–20, etc., if desired or in other patterns, as shown in my copending application without altering the scope of the invention.

The digital selector circuitry for the horizontal grid set 14 includes a units delay line 119U having taps 0–9 and three tens delay lines 119R, 119B, 119G, each of which delay lines includes ten taps 0R–9R, 0B–9B and 0G–9G.

With reference to the units delay line 119U it wll be apparent that the first group V0 of three conductors V0R, V0B, V0G are connected to tap "0" (the first tap) on the units delay line. The three conductors of the groups V10, V20, etc., are also connected to such tap. The conductors V1R, V1B, V1G of the second group V1 are connected to tap 1 on units delay line 119U, and the three conductors of groups V11, V21, etc., will also be connected to such tap. As will be apparent a separate units delay line, such as 119U, could be used for each color (i.e., 119R, 119B, 119G). In such event, conductor V0R would be connected to the first tap "0" of the red units line 119R, conductor V0B would be connected to the first tap "0" of the blue units line 119B, etc.

The opposite ends of the first group V0 of the horizontal grid conductors are connected to taps on the tens selector switches 119R, 119B, 119G, the first conductor of the groups V0–V9 being connected to the first tap on delay line 119R, the second conductor of each of the groups V0–V9 being connected to the first tap on delay line 119B, and the third conductor of groups V0–V9 being connected to the first tap on delay line 119G.

In a similar manner the three different conductors of each of the groups V10–V19 are connected to the second tap "1" of the different delay lines 119R, 119B, 119G; the three different conductors of each of the groups V20–V29 are connected to the third tap (2) of the three different delay lines 119R, 119B, 119G, etc.

Various methods of connecting the horizontal grid conductors V0G, V0B, etc., to the taps on the tens and units selector switches 119U, 119R, 119B, 119G are shown in my copending application (see FIGURES 3, 3A, 4 and 5, for example) and such details are not included in the drawings hereat in the interest of providing a more clear description of the invention of the present disclosure.

Vertical control circuitry 26 is controlled by signals coupled over the vertical input position conductor 29 and the output thereof is in turn coupled over conductor 163 to double pulser 126' including generator sections 126L, 126R for the three tens delay lines 119R, 119B 119G associated with the horizontal grid set, and also over conductor 171 to double pulsers 172R, 172L for the units delay line 119U for the groups of horizontal grids V0, V1, etc.

The left hand section 126L of pulser 126' is connected over pulse driver 134 and conductor 127 to one end of each of the color delay lines 119R, 119B, 119G via contacts 138R, 138B, 138G respectively, and the second section 126R of pulser 126 is connected over pulse driver 136 and conductor 128 to the second end of each of the tens delay lines 119R, 119B, 119G. Color gate 138 controls contacts 138R, 138B, 138G in the manner described heretofore in the selection of different ones of the delay lines 119R, 119B, 119G for operation.

The left hand section 172L of pulser 172 is connected over pulse driver 173 and conductor 174 to one end of units selector switch 119U, and the second section 172R of pulser 172 is connected over pulse driver 175 and conductor 176 to the opposite end of the units delay line 119U.

*Selection of a point on display panel 32*

For exemplary purposes, it will now be assumed that the coordinate V1, H12 on display panel 10 is to provide the display of a red dot. With reference to FIGURE 9, it is apparent that such coordinate is defined by the intersection of the twelfth vertical grid (third grid in second group of ten vertical grids 10–19) and the horizontal grid V14 (first grid of the group V1 of the "tens" groups V0–V9). To effect energization of the twelfth vertical grid, a voltage signal is coupled over horizontal position conductor 22 to the horizontal control circuitry 21 which is of a value to indicate that selection of the twelfth vertical grid is desired. Horizontal control circuitry 21 in turn couples a voltage signal over conductor 160 to double pulser 148L, 148R, of a value to effect generation of a first and second pulse for coupling to opposite ends of delay line 118T which are operative to coincide at the second tap (10–19) on delay line 118T at a predetermined time TC after sync. The value and nature of the signal extended to double pulser 148 to effect selection of a specific tap on delay line 118T is described in detail in the above-identified copending application.

Simultaneously, horizontal delay circuitry 21 also transmits a voltage signal over conductor 161 to double pulser 164 to control the pulser in the transmission of pulse pairs to opposite ends of delay line 118U which coincide at the third tap (2) on delay line 118U at the same predetermined time interval TC after sync. With simultaneous coincidence of the pair of pulses at the second tap (10–19) on delay line 118T and coincidence of the pair of pulses on the third tap (2) on delay line 118U, diodes 162m and 169m are biassed to cutoff to provide a voltage signal on the twelfth vertical grid, which is in the order of twice the amplitude of the pulses on the individual delay line. Since the coincident pulses appear only at the second tap (10–19) on delay line 118T and only at the third tap (2) on delay line 118U, only the twelfth vertical grid will be energized by a voltage twice the value of the indicated pulses that appear on the lines 118U, 118T. It should be noted that the voltage which appears on the twelfth vertical grid is still insufficient by itself to effect energization of the phosphor which lies adjacent thereto.

It will be recalled that the spot to be energized in the present example is defined by the intersection of the twelfth vertical grid V12 and the first horizontal grid V1R of the second group V1 of the first tens group 0–9. Selection of the horizontal conductor V1R is effected by a signal which is applied over vertical position conductor 29 to vertical control circuitry 26 which in turn provides voltage signals over conductors 163 and 171 to pulsers 126 and 172 to effect selection of horizontal grid V1R.

More specifically, vertical control circuitry 26 couples a voltage signal over conductor 170 to the double pulsers, 126L, 126R, and the pulsers generate a pair of pulses in the manner described in my previous application for transmission over pulse drivers 134, 136 and conductors 127, 128. In that the display is to be shown in the color red, the input conductor R on color gate 138 is energized to effect closure of contacts 138R, and the resultant connection of delay line 119R to the output of double pulse 126L, 126R. The output pulse pair is then coupled to opposite ends of tens delay line 119R to coincide at the first tap (0–9) on the tens delay line 119R at the predetermined interval TC after sync.

Vertical control circuitry 26 also transmits a voltage signal over conductor 171 of a value to control the double pulser 172 to effect the transmission of a first and second pulse over pulse drivers 173, 175 and conductors 174, 176 respectively to opposite ends of units delay line 119U in timed relation to coincide at the second tap thereof (1) at the predetermined time TC after sync.

With the simultaneous energization of the first tens tap (0–9) on red delay line 119R and the second units tap (1) on delay line 172, horizontal grid V1R is energized by full voltage simultaneously with the energization of the twelfth vertical grid. The phosphor in the display panel 32 has a characteristic such that the voltage of one grid alone in either set is insufficient to illuminate the phosphor, and of a value which will excite responsive to the coupling of full voltage to a grid in both the horizontal set and the vertical set. The energization of the twelfth vertical grid and the horizontal grid V1R by full power in the manner described results in the energization of the spot of phosphor which is located at the intersection thereof to provide the display of a red phosphor dot.

Manifestly, if the dot were to be displayed as a blue dot, the input conductor B for color gate 138 would be energized and the contacts 138B would be closed to connect delay line 119B to the output of pulsers 126L, 126R, whereby conductor V1B is energized to provide a blue dot display. The manner of displaying a green dot at the same coordinate will be obvious therefrom.

*Optical gating with digital switching*

In a further embodiment of the display system set forth in FIGURE 10, optical gating is used in combination with electrical switching to effect a display at the different coordinate points on a display area. In the embodiment set forth in FIGURE 10 the optical and electrical switching units are used in a digital display system of the type set forth in FIGURE 9.

As there shown, the display system comprises a display panel 232 having one hundred vertically extending grids (H1–H100) and three hundred horizontally extending grids (V0R, V0G, V0B . . . V99R, V99G, V99B) which are arranged in the manner of the horizontal and vertical grids of the display panel 32 (FIGURE 9). The one hundred vertically extending grids are divided into groups of ten. Selective energization of the vertically extending grids is effected in the manner of the embodiment shown in FIGURE 9, the circuitry including a vertical units delay line 128V which has ten taps 0–1 thereon, each of which is connected to a corresponding tap in which group of ten vertically extending grids. A double pulse generator 264 which is controlled by horizontal control circuitry 221 effects selection of a tap on the delay line 218T by effecting coincidence of a pair of pulses at such tap.

The horizontally extending grids V0G, etc., are divided into groups of thirty, each group of thirty grids being comprised of three groups of ten color control grids. The first group, for example, includes grids V0R–V9R, V0G–V9G, V0B–V9B, disposed for use in energizing the red color strips 0R–9R, 0G–9G and 0B–9B of the first tens group which are disposed adjacent to the associated ones of the horizontally disposed grids in the manner of the display panel 32 (FIGURE 3).

The three hundred horizontal color control grids are selectively energized by units delay lines 219G, 219B, 219R, each of which has ten taps 0–1 thereon. The units conductors in each "tens" group are connected to the corresponding taps of the associated one of the color delay line switches 219G, 219B, 219R. Thus, one end of the first "green" control grids V0G, V10G, V20G, etc., in each group of tens is connected to the first tap "0" on the green units delay line 219G. One end of the first blue control grids V0B, V10B, V20B, etc., in each group of tens is connected to the first tap "0" of the blue units delay line switch 219B, and one end of the first red control grids V0R, V10R, V20R, in each of the group of ten is connected to the first tap on the red units delay line switch 219R. The horizontal delay lines 219G, 219B, 219R are connected for operation by a color gate switch 238 and a double pulse generator 272 which is in turn controlled by vertical control circuitry 226.

The color gate switch 238 is connected in the manner of the color gate 138 (FIGURE 9) to select switching delay lines 119G, 119B, 119R for operation, and thereby the particular color or colors are to be displayed at any given time. The manner of operation of the vertical units delay lines 218T and the horizontal units delay lines 219G, 219B, 219R to select a grid connected thereto will be apparent from the preceding description relating to FIGURE 9 herein.

The display system of FIGURE 10 further includes a set of ten vertically extending light gates 291A–291J and a set of ten horizontally extending light gates 281A–281J. Each horizontally extending gate, such as 281A, extends coextensively with the thirty grids which comprise a first tens group of horizontal grids V0G, V0B, V0R–V9G, V9B, V9R. Each of the other horizontally extending light gates 281B–281J extend coextensively with an associated horizontally disposed "tens" group of grids (thirty grids in each tens group). Each vertically extending light gate, such as 291A, extends coextensively with a first group of ten vertical grids 0–9, the second vertically extending group 291B extends coextensively with the second group of ten vertically extending tens grids 10–19, etc.

The horizontally extending light gates 281A–291J are selectively operated by an associated tens delay line switch 219T which has ten taps 0–9, 10–19, etc., thereon, successive ones of which are connected to successive ones of the horizontally extending light gates 218A–218J. The tens delay line switch 219T is controlled by double pulser 226′ and vertical control circuitry 226 in the manner of the tens vertical switch of FIGURE 9.

The vertically extending light gates 291A–291J are connected for selective energization by tens delay line 218T which has ten taps 0–9, 10–19, etc., successive ones of which are connected to successive ones of the vertically extending light gates 291A–291J. The tens delay line switch 218T is connected for control by double pulser 248 and horizontal control circuitry 221 in the manner of the tens horizontal switch in the embodiment of FIGURE 9.

In accordance with known techniques, a horizontal and vertical light gate which are simultaneously energized, transmit light over such portions of the two gates which are coextensive. Thus, for example, if the first horizontally extending light gate 281A is energized by selection of the first tap 0–9 on the tens switch 219T, and the first vertically extending light gate 291A is energized by reason of selection of the first tap 0–9 on the tens vertical switch 218T, light will be transmitted only over the portion of the light gates 281A and 291A which are coextensive with each other (i.e., the area defined by $x=0, 9$; $y=0, 9$). The manner in which such structure is used in combination with a grid selection arrangement disclosure is now set forth herein.

Assuming, initially, that a red dot is to be displayed at the coordinate $x=1$, $y=1$, the input signal on the horizontal positioning conductor 222 of horizontal control circuitry 221 will be of a value to indicate that the coordinate $x=1$ is to be selected by the units selection switch 218U. The horizontal control circuitry 221 is operative responsive thereto to transmit a signal of a value over conductor 261 which controls the double pulser 264 to generate a pair of pulses which are extended over conductors 265, 266 to opposite ends of units selection switch 218U to effect the coincidence of a pulse of the second tap on units selector switch 218U and the coupling of a coincident pulse to the vertically extending grids 1, 11, 21, etc. The horizontal control circuitry 221 also effects the transmission of a signal over conductor 260 to the double pulse generator 248 which transmits the pulses of a pair over conductors 223, 224 respectively to opposite ends of tens vertical selection switch 218T to effect coincidence thereof at the first tap on the tens vertical selection switch (coordinate 1 being in the first group of ten) to thereby effect the energization of the first vertically extending light gate 291A.

In a similar manner, the signal extended over the vertical position conductor 229 indicates that the coordinate $y=1$ is to be energized, and the vertical control circuitry 226 thereupon provides a signal over conductor 271 to the double pulser 272 which operates to transmit the pulses of a pair over conductors 274 and 276 to the one or ones of the units selection switches 219G, 219B, 219R which are connected thereto by the color gate 238.

In the present example, it is assumed that the color red is to be displayed, and accordingly a signal is transmitted over conductor R to color gate 238 which effects closing of contacts 238R. As a result, the pulses transmitted over conductors 274, 276 will coincide at the second tap (1) on delay line 219R and a coincident pulse will be coupled over the grids V1R, V11R, V21R, etc., which are connected to such tap. Simultaneously, the vertical control circuitry 226 effects the transmission of a signal over conductor 263 which has a potential value to control the double pulse generator 226' to transmit the pulses of a pair over conductors 227, 228 to opposite ends of delay line 219T, the pulses being timed to intersect at the first tap 1–10 on the delay line 219T to thereby effect energization of light gate 281A which is connected thereto.

It will be apparent that as a result of the selection of the second tap on the units delay line 218U and the first tap on the delay line 219R, one hundred coordinates defined by grids $x=1, y=1R$, will be energized ($x=1, y=1R$; $x=11, y=1R$; $x=21, y=1R$; etc.; $x=1R, y=11R$; $x=11, y=11R$; $x=21, y=11R$, etc; $x=1, y=21R$; $x=11, y=21R$; $x=21, y=21R$, etc). However, in that only the first horizontally extending light gate 281A, which is coextensive with the first tens group (thirty grids) of the horizontally extending grids, and the first vertically extending light gate 291A, which is coextensive with the first ten vertically extending grids, are energized to effect the transmission of light thereover, the only phosphor dot energized at the time which will appear to the eye of the viewer is the dot which is identified by the coordinates $x=1, y=1R$. The manner in which other points on the display device may be selectively energized will be apparent therefrom.

It will be readily apparent to parties skilled in the art that the display system may be comprised entirely of optical gating units controlled by the delay line switches in the manner set forth herein. Further, such arrangement is operative as in the embodiment of FIGURE 2, for example, with a straight selection system rather than the digital selection system, if desired. Although the foregoing embodiments were illustrated in display units having a 100 x 100 matrix (or 300 x 100 matrix) the manner in which such systems will be operable with larger size display devices will also be obvious to parties skilled in the art.

It will be further apparent that the optical and electrical switching combination set forth herein could also be used to provide a single color display system in which event only one hundred horizontal grid lines would be used, and only one units switch 219 would be required.

It is also apparent that the display device can be constructed in such manner that the light gates could be used in the units selections, and a grid matrix could be used for tens selection if desired. Other combinations of the optical and grid matrix structures set forth in FIGURE 10 will be readily apparent to those skilled in the art.

While what is described is regarded to be a preferred embodiment of the invention, it will be apparent that variations, rearrangements, modifications and changes may be made therein without departing from the scope of the present invention as defined by the appended claims.

What is claimed is:

1. In a color display device, a plurality of sets of selector grids, a plurality of sets of color control grids extending in a direction perpendicular to said first grids, a plurality of sets of color producing means, the grids of at least one of said color control sets being disposed in superposed relation with the grids of a second one of said color control sets, each different set of color producing means being operative to provide a light output in a different color, and means for supporting each of said color control grid sets for use with a different one of said selector grid sets in controlling a light output by at least one corresponding set of said color producing means.

2. In a collor display device, a first set of selector grids, a plurality of sets of color control grids extending in a direction perpendicular to said first grid set, the grids of at least one of said sets of color control grids being disposed in superposed relation with the grids of a second one of said sets of color control grids, a plurality of sets of color producing means, each different set of said color producing means being comprised of a plurality of strips, each of which sets of strips is operative to provide a light output in a different color, the strips of one set being supported in superposed relation with the strips of at least one other set and means for supporting each of said color control grid sets for use with said first set of selector grids in controlling the color output of the strips of at least one set of said color producing means.

3. In a color display device, a first set of selector grids, a plurality of sets of color control grids extending in a direction perpendicular to said first grid set, color producing means comprising phosphor means having areas disposed for selective energization by said selector grids and said control grids, and filter means having a plurality of sets of color producing means, means for supporting each of said color control grid sets to selectively energize said phosphor adjacent one corresponding set of said color producing means on said filter, different color control grid sets being disposed to provide energization of the phosphor adjacent different sets of color producing means on said filter means.

4. In a color display device, a plurality of color producing means, each different color producing means being operative to provide a light output in a different color, a plurality of sets of selector grids, a plurality of sets of color control grids extending in a direction perpendicular to said selector grid sets, at least one grid of one of said color control grid sets being disposed for use in controlling the color output of at least a first and a second one of said color producing means.

5. In a color display device, a plurality of color producing means disposed in spaced superposed relation, each different color producing means being operative to provide a light output in a different color, a plurality of sets of selector grids, a plurality of sets of color control grids extending in a direction perpendicular to said selector grid sets one of said color control grid sets being disposed in a plane between a first and a second one of said color producing means for use with a first and a second one of said sets of selector grids in controlling the color output of at least a first and a second one of said color producing means.

6. In a color display device, a plurality of color producing means disposed in spaced superposed relation, each different color producing means being operative to provide a light output in a different color, a plurality of sets of selector grids, a plurality of sets of color control grids extending in a direction perpendicular to said selector grid sets one of said sets of selector grids being disposed between a first and second one of said color producing means for use with at least a first and a second one of said color control grid sets to control the color output of a first and a second set of said color producing means.

7. In a color display device having a viewing area, a first grid set comprised of a plurality of selector grids disposed in spaced, parallel relation, a plurality of color control grids extending in a direction perpendicular to said first grid set, a display area including a plurality of color producing means, each of which is operative to provide a light output in a different color, and means for supporting each of said color control grids in operative relation with at least one of said selection grids to control the light output at one point, at least, on a corresponding one of said color producing means, and light gate means disposed in superposed relation with said point on said display area for selectively transmitting the light output of said one point to said viewing area.

8. A color display device as set forth in claim 7 in which said first grid set is divided into groups, each of which groups has an identical number of grids, and said color control grids are divided into groups, each of which groups has an identical number of grids, and in which said light gate means includes means operative to selectively transmit the color output of said color producing means located at different crosspoints of said first grid set and said color control grids.

9. In a color display system, a plurality of sets of selector grids, a display device including a plurality of sets of color control grids extending in a direction perpendicular to said first grid set, the grids of at least one of said color control grid sets being disposed in superposed relation with the grids of a second one of said color control sets, a plurality of sets of color producing means, each different set being operative to provide a light output in a different color, means for supporting each of said color control grid sets to control the color output of at least one corresponding set of said color producing means, and switching means operative to selectively energize one grid of said first set and one of said color control grids to provide a light output by the color producing means located at the crosspoint of the energized grids.

10. In a color display system, a display device including a first set of selector grids, a plurality of sets of color control grids extending in a direction perpendicular to said first grid set to provide a plurality of crosspoints, the grids of at least one of the color control grid sets being disposed in superposed relation with the grids of a second one of the color control sets, a plurality of sets of color producing means, each different set being operative to provide a light output in a different color, and means for supporting each of said color control grid sets to control the color output of at least one set of said color producing means, and switching means including selector means comprising at least one delay line having a plurality of taps connected to different grids of said first set, pulse generator means for selectively energizing one tap on said delay line to selectively energize one selector grid of said first set which is connected thereto, and means for energizing one of said color control grids to provide a light output by the color producing means located at the crosspoint of the energized ones of said color control grids and said selector grid.

11. In a color display system, a display device including a first set of grids, a plurality of sets of color control grids extending in a direction perpendicular to said first grid set, a plurality of sets of color producing means, each different set being operative to provide a light output in a different color, and means for supporting each of said color control grid sets to control the color output of at least one corresponding set of said color producing means, and switching means including a first means operative to selectively energize one grid of said first set, and color selector means including a plurality of delay lines, each of which comprises a plurality of taps, means connecting the taps of each of said delay lines to the grids of a different one of said color control sets, and pulse generator means for providing pulses to selectively energize a tap on at least one of said delay lines and the one of said color control grids which is connected thereto, said color producing means located at the crosspoint of an energized grid of said first set and an energized one of said color control grids being operative to provide a light output in a corresponding color.

12. In a color display system, a first set of grids, a plurality of sets of color control grids extending in a direction perpendicular to said first grid set, a plurality of sets of color producing means, each different set comprising a plurality of horizontally disposed strips operative to provide a light output in a different color, the strips of one set, at least, being disposed in a different plane than the strips of the other sets, and means for supporting each of said color control grid sets in different spaced planes to control the color output of a different set of said color producing means, and switching means including at least one delay line having a plurality of taps, means connecting the different color control grids of one set, at least, to the different taps on said delay line, means operative to selectively energize one tap on said delay line and the one of said color control grids connected thereto, and means for simultaneously energizing one grid of said first set to provide a light output by the color producing means located at the crosspoint of said two energized grids.

13. In a color display system, a first and a second set of selection grids, at least one set of control grids extending in a direction perpendicular to said first and second selection grid set, at least a first and a second color producing means disposed in different planes on opposite sides of said one set of control grids, each different color producing means being operative to provide a light output in a different color, and means for supporting said one control grid set in a plane located between the planes of said first and second color producing means to control the color output of at least said first and second color producing means, and switching means including means to selectively energize one of said grids in said control grid set, a first means operative to energize a selection grid in said first set with said one control grid to energize a crosspoint in said first color producing means, and a second means operative to energize a selection grid in said second set with said grid in said control grid set to energize a crosspoint in said second color producing means.

14. In a color display system including a display device comprised of means disposed in superposed relation including a first set of horizontally disposed grids, a first color producing means, a first set of vertically disposed grids, a second color producing means, a second set of horizontally disposed grids, a third color producing means, and a second set of vertically disposed grids, a plurality of selector switches, each of which is operative to selectively energize any grid in an associated one of said grid sets, and switching means having a plurality of switching positions, said switch being operative in a first position to enable said selector switches for said first set of horizontally disposed grids and said first set of vertically disposed grids, said switching means being operative in a second position to enable the selector switches for said first vertically disposed grid set and said second horizontally disposed grid set, and said switching means being operative in a third position to enable the selector switches for said second horizontally disposed grid set and said second vertically disposed grid set.

15. In a color display system, a display device including a first set of grids, a plurality of sets of color control grids extending in a direction perpendicular to said first grid set, color producing means comprising a phosphor means disposed adjacent said grids for excitation thereby, a color filter having a plurality of sets of lines disposed adjacent said phosphor layer, each different set of lines being operative to provide a light output in a different color, and means for supporting each of said color control grid sets to control the color output of one corresponding set of said color producing means, different control grid sets being disposed to control different sets of color producing means, and switching means including means operative to selectively energize one grid of said first set, and means operative to selectively energize one of said color control grids in said color control grid sets to provide a light output by the portion of the one of the color producing lines located adjacent the phosphor means at the crosspoint of the energized ones of said grids.

16. In a color display system, a first set of grids, at least one set of color control grids extending in a direction perpendicular to said first grid set, color producing means disposed for control by the grids of said first and second set, switching means including means operative to selectively energize one grid of said first set, and means operative to selectively energize one of said color control grids, said color producing means being operative responsive to energization of a grid in each set to provide a light output at one point, at least, light gate means disposed in superposed relation with said one point at least, and switching means for energizing said light gate means to selectively transmit the light output of said one point.

17. In a color display system having a viewing area, a first set of grids, at least one set of color control grids extending in a direction perpendicular to said first grid set, color producing means disposed for control by the grids of said first and second set, switching means including means operative to selectively energize a plurality of grids in said first set, and means operative to selectively energize a plurality of grids in one of said sets of color control grids to provide a light output by the associated one of said color producing means at one point at least, light gate means comprising a plurality of vertically disposed gates and a plurality of horizontally disposed gates disposed between the viewing area and the light output provided by the color producing means, and switching means including means for energizing one of said vertically disposed gates, means for selectively energizing one of said horizontally disposed gates, said vertical and horizontal light gates being operative to selectively transmit the light output at the ones of said points located in the area defined by the coextensive portions of said one horizontal light gate and said one vertical light gate.

18. In a color display system having a viewing area, a first set of grids, a plurality of sets of color control grids extending in a direction perpendicular to said first grid set, a plurality of sets of color producing means, each of which is disposed for control by the grids of said first set and one of said sets of color control grids, switching means including means operative to selectively energize a plurality of grids of said first set, and means operative to selectively energize a plurality of grids of said one color control set to provide a light output by the associated color producing means at each crosspoint of the energized grids in said first set and said one color control set, light gate means in superposed relation with one crosspoint at least, and switching means including means for energizing said light gate means to selectively transmit the light output at only one of said plurality of points.

19. In a color display device, a display area comprising color producing means, point selection means for controlling the color of the light output provided at different points by said color producing means, a plurality of sets of light gate means located in substantially coextensive and superposed relation with said color producing means, and means for selectively energizing said light gate means and said point selection means in the provision of a color output at a point on said display area selected by said point selection means and said light gate means.

20. A color display device as set forth in claim 1 in which the grids of said plurality of sets of selector grids have the corresponding grid members of their sets arranged in superposed relation with each other, and means for connecting an energizing signal simultaneously to a corresponding grid in each of said plurality of sets.

21. In a color display system, a display device including a first set of selector grids, a plurality of sets of color control grids extending in a direction perpendicular to said first grid set, a plurality of sets of color producing means, each different set of color producing means being operative to provide a light output in a different color, and means for supporting each of said color control grid sets to control the color output of at least one set of said color producing means, the grids of each set of color control means being divided into groups, each group having "n" grids, switching means operative to selectively energize one selector grid of said one set, and a plurality of color selection switches, each of which comprises a selection switch having a plurality of taps, each of which taps is connected to a different group of color control grids in its associated set, and at least one switch having a plurality of taps, each of which is connected to a corresponding grid in each of the different groups of color control grids, and means for selectively energizing a tap on one of said selection switches, and a tap on said one switch to energize a color control grid and simultaneously said one selection grid to thereby energize the color producing means located at the crosspoint of said selector grid and the energized one of the color control grids.

22. A color display system as set forth in claim 11, which includes color gating means, input means for providing color selection signals to said color gating means, and switch means controlled by said color gating means for selectively connecting different ones of said delay lines to said pulse generator means.

23. A color display system as set forth in claim 13 which includes a third color producing means disposed in superposed relation with said first and second color producing means, said one control grid set and said first and second set of selector grids, and a second set of control grids extending in the direction of the first control grid, means for energizing a control grid in said second set of control grids, and means for controlling said second means to energize a selection grid in said second set during the period said control grid in said second set is energized.

References Cited by the Examiner

UNITED STATES PATENTS

| | | | |
|---|---|---|---|
| 3,042,834 | 7/1962 | Nicoll | 315—169 |
| 3,048,824 | 8/1962 | Thompson | 315—169 |
| 3,105,197 | 9/1963 | Aiken | 340—147 |

DAVID G. REDINBAUGH, *Primary Examiner.*

J. H. SCOTT, *Assistant Examiner.*